United States Patent [19]

Fischman et al.

[11] 4,099,943
[45] Jul. 11, 1978

[54] COMPOSITE FLUID FILTERING MEDIUM AND METHOD OF MAKING

[75] Inventors: Kurt Fischman, New Milford, N.J.; Robert Offer, Racine, Wis.; Bernard Rudner, Ridgewood, N.J.; David Shepard, Racine, Wis.

[73] Assignee: Tenneco Chemicals, Inc., Saddle Brook, N.J.

[21] Appl. No.: 733,290

[22] Filed: Oct. 18, 1976

[51] Int. Cl.² .................................... B01D 39/16
[52] U.S. Cl. ........................... 55/487; 55/524; 55/DIG. 5; 55/DIG. 13; 55/DIG. 16; 156/309; 156/331; 156/334; 428/311; 428/314; 428/315
[58] Field of Search .......... 55/486, 487, 524, 527, 55/528, DIG. 5, DIG. 13, DIG. 16; 428/311, 314, 315; 156/309, 326, 331, 334; 210/508, 509

[56] References Cited

U.S. PATENT DOCUMENTS

| | | | |
|---|---|---|---|
| 2,620,044 | 12/1952 | Fine et al. | 55/524 |
| 2,654,440 | 10/1953 | Robinson | 55/524 |
| 2,661,238 | 12/1953 | Osti et al. | 55/524 |
| 2,751,039 | 6/1956 | Hanly | 55/524 |
| 2,839,158 | 6/1958 | Reinauer | 55/524 |
| 3,118,750 | 1/1964 | Dunlap et al. | 55/524 |
| 3,171,820 | 3/1965 | Volz | 55/528 |
| 3,228,820 | 1/1966 | Samson | 428/311 |
| 3,362,036 | 1/1968 | Swan et al. | 156/331 |
| 3,400,520 | 9/1968 | Sakurai | 55/487 |
| 3,463,689 | 8/1969 | Palmai | 55/524 |
| 3,464,940 | 9/1969 | Barton et al. | 156/331 |
| 3,533,901 | 10/1970 | Sutker | 428/315 |
| 3,575,760 | 4/1971 | Goldstein et al. | 156/309 |
| 3,646,154 | 2/1972 | Marans et al. | 156/331 |
| 3,702,794 | 11/1972 | Hartlein | 156/331 |
| 3,717,528 | 2/1973 | Peerman et al | 156/331 |
| 3,720,574 | 3/1973 | Kunc | 428/311 |
| 3,861,889 | 1/1975 | Takae et al. | 55/486 |
| 3,907,733 | 9/1975 | Jackson, Jr. et al. | 156/331 |
| 3,930,099 | 12/1975 | Gregson | 428/315 |
| 3,930,102 | 12/1975 | Müller et al. | 156/331 |
| 3,933,548 | 1/1976 | Knisely et al. | 428/314 |

FOREIGN PATENT DOCUMENTS

| | | | |
|---|---|---|---|
| 2,237,667 | 2/1975 | France | 55/487 |
| 1,103,885 | 4/1961 | Fed. Rep. of Germany | 156/331 |

*Primary Examiner*—Frank W. Lutter
*Assistant Examiner*—David L. Lacey
*Attorney, Agent, or Firm*—John Boustead; James P. Scullin

[57] ABSTRACT

A layer of open cell polyurethane foam adhered to a layer of a non-woven fibrous material of fine porosity relative to the foam results in an efficient fluid (e.g., air) filtering medium having a high capacity for retaining particulate contaminants. The combined layers are useful as an air filter element.

12 Claims, 4 Drawing Figures

COMPOSITE FLUID FILTERING MEDIUM AND METHOD OF MAKING

SUMMARY OF THE INVENTION

Air filter elements find wide application where it is desired to remove particulate matter from air. Thus, air filter elements are used to clean the air supplied to an automobile engine.

Air filter elements which serve to remove particulate matter from air must be efficient, offer a minimum resistance to air flow and be capable of achieving the desired levels of efficiency and lack of flow resistance during a variety of operating conditions and for extended periods of time. Current typical automotive industry specifications for air filters, for example, require the air filter element to have (1) a particulate matter holding capacity of 100 grams AC Course Test Dust as measured by the Society of Automotive Engineers Air Cleaner Test Code — SAE J726b; (2) a fluid flow capacity of 320 cubic feet per minute (CFM) and a particulate matter removal efficiency of 98 per cent.

The composite filter medium of this invention enables construction of an air filter element which provides all the features and meets or exceeds all the requirements set forth above. A preferred form of the composite filter medium of this invention is comprised of a layer of open cell polyurethane foam preferably attached, such as by an adhesive, to a substantially flat layer of a non-woven fibrous material, such as conventional air filter paper. The polyurethane foam component of the composite medium, preferably wetted with an impingement fluid, serves as a depth type filter medium and is placed upstream from the relatively fine porosity non-woven fibrous component of the medium. An impingement fluid which will not run off or evaporate from the foam under the temperature conditions of operation aids in holding particulate matter on the surfaces of and within the foam.

REFERENCE TO DRAWINGS

Figure 3:
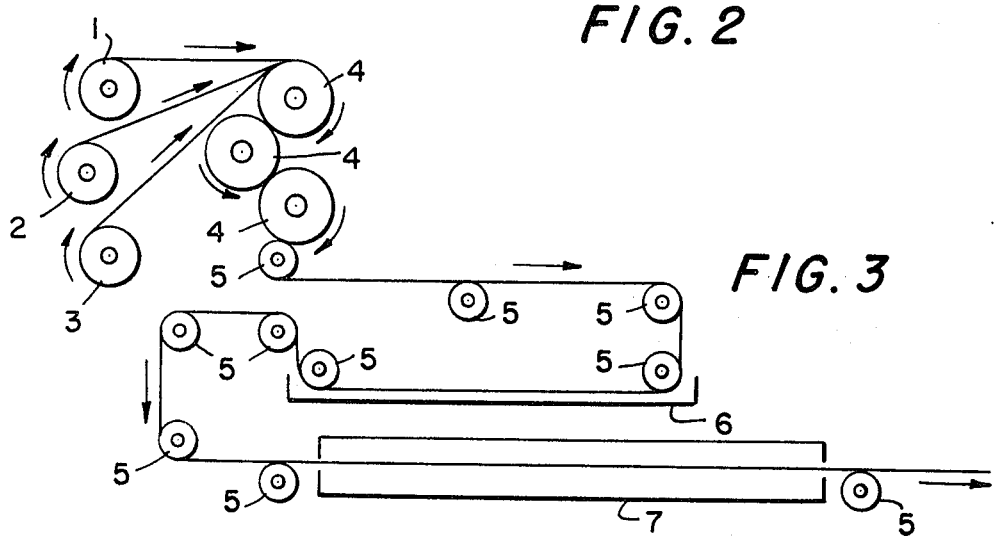
Figure 4:
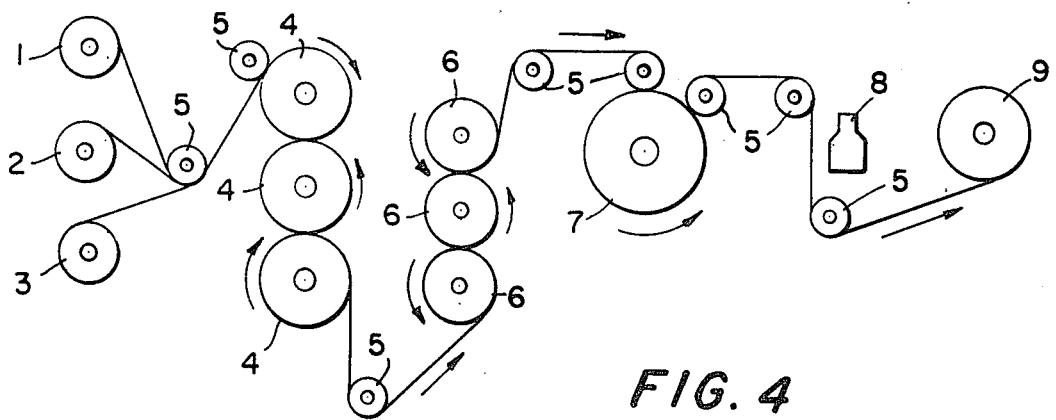

FIG. 3 represents in diagrammatic form an apparatus in which heated steel laminating drums are used to bond the polyurethane foam to the non-woven fibrous material by means of a hot melt adhesive and in which the foam is impregnated with an impingement fluid by using a trough containing the impingement fluid; and FIG. 4 represents in diagrammatic form an apparatus in which heated steel laminating drums are used and the foam is impregnated with an impingement fluid by means of a spray.

DETAILED DESCRIPTION

Open cell polyurethane foams which can be used in making the composite fluid filter medium are well known commercial materials. Suitable foams can be made in accordance with the teachings of U.S. Pat. No. 3,171,820 to R. A. Volz; U.S. Pat. No. 3,297,803 to Meisel and Blair; U.S. Pat. No. 3,884,848 to Ricciardi, Cordora and Smudin; U.S. Pat. No. 3,300,558 to Grant and Jenson; U.S. Pat. No. 3,475,525 to Peters; U.S. Pat. No. 3,608,056 to Nelson; U.S. Pat. No. 3,718,613 to Conger and Evans; U.S. Pat. No. 3,748,288 to Winkler, Bredbenner and Adlum; U.S. Pat. No. 3,862,282 to Watson; and U.S. Pat. No. 3,753,756 to Lox and Petrich.

When the composite fluid filter is used, the fluid from which the particulate matter is to be removed first contacts the foam and then the non-woven fibrous material. The pore size of the foam will generally be within the range from about 8 to about 125 pores per linear inch. The foam has larger pores than the non-woven fibrous material, the object being to provide a filter which removes the large particles first and then the smaller particles. If desired, the foam can be composed of two or more layers of foam of different pore sizes, the layer of foam adjacent the non-woven fibrous material having the pores of smallest size and each succeeding layer of foam having pores of larger size, the layer of foam having the pores of largest size being located farthest from the non-woven fibrous material.

As has been mentioned above, the foam can be wetted with an impingement fluid, the preferred characteristics of which depend uppon the particular use to which the composite filter medium is put. The amount of impingement fluid used to wet the foam can vary widely, depending upon the particular foam and the particular impingement fluid used, but should not be in amount such that the non-woven fibrous layer is wet. In general, the dry weight pickup of impingement fluid on the foam will be from 5 to 50 per cent, and preferably from 15 to 30 per cent. Among the useful impingement fluids are the silicone oils such as dimethyl silicones, chlorinated paraffins, tris-(dinonylphenyl) phosphate, di-tridecyl phthalate, polyethylene glycol dibenzoates, polyphenyls, hydrogenated polyphenyls, poly(tetramethylene glycol) azealates, and aryl sulfonamides and their formaldehyde condensates.

Depending upon the use to which the filter is put, the foam can contain pigments, fillers, antimicrobial agents, antistatic agents, and flame-retardants. Among the flame-retardants which the foam can contain are $Mg(NH_4) PO_4$ of other flame-retardant phosphates or dicyandiamideformaldehyde-phenolcondensates. Other halogen-containing or phosphorus-containing flame-retardants can also be contained in the foam, for example, dibromobutenediol or tribromoneopentyl alcohol.

The non-woven fibrous material can be paper or felt. Conventional air filter paper, which is commercially available and relatively inexpensive, has definable and controllable porosity. Such air filter paper frequently contains a phenol-formaldehyde resin or other resin such as urea-formaldehyde or melamine-formaldehyde. In manufacturing the composite filter medium of this invention using one of the hot-melt adhesives described below, it is preferable that the resin be in the uncured state at the time when the hot-melt adhesive is used, in order that the composite filter medium produced will be of greater flexibility. The non-woven fibrous material can also be made of nylon fibers or rayon fibers.

A wide variety of adhesives is commercially available and suitable for use in the manufacture of the composite fluid filtering medium of this invention. Such adhesives can be polyamides, polyesters, polyethylene, polypropylene, plasticized polyvinyl chloride, polyvinyl acetate, polyurethane, and other thermoplastics. For a discussion concerning adhesives and their use reference is made to the article by Dieter Blennemann entitled "Bonding With Hot-Melt Adhesives" which appeared in Textile Chemist And Colorist, Jan. 28, 1970, Vol. 2, No. 2. Hot-melt adhesives are commercially available in various forms, such as string or in open-net form.

Those skilled in the art will understand that the adhesive used should be chosen such that the lamination between the foam and the non-woven fibrous material is not destroyed under the conditions of use, for example, by heat or chemical attack, such as the solvent attack of oxidized gasoline in an automobile air filter. Also, those skilled in the art will understand that the adhesive used should be chosen such that fluid flow and dust filtration efficiency are not unduly impaired. Thus, should a liquid adhesive be used, it should be sparingly applied so as not to impair permeability unduly. If the adhesive used is in the form of a polymer film, it should be at least as permeable as the paper. Hence, most of the commercially available forms of hot melt adhesive films are unsuitable, because they produce impervious bonds between the foam and the non-woven fibrous material.

The following Examples illustrate the invention, or provide information relative to the invention, and are not restrictive of the invention. The physical properties of polyurethane foams have been determined by ASTM D-1564.

EXAMPLES 1 and 2

Figure 1:
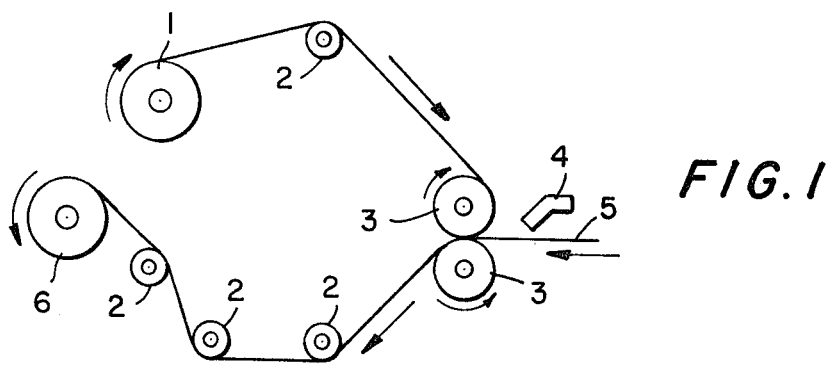
FIG. 1 represents in diagrammatic form an apparatus in which the composite filter medium of this invention can be manufactured by a procedure involving flame lamination.

These Examples relate to operations in which flame lamination apparatus similar to that shown in FIG. 1 was used.

In Example 1, the foam used was a polyester-base open cell "powder puff" foam having a pore size of 100 pores per linear inch, a density of 1.75 pounds per cubic foot, a tensile strength of 34 pounds per square inch, an elongation of 550 per cent, and a tear strength of 3.8 pounds per square inch. The foam was black in color and had a soft texture. The foam is believed to have been made by the procedure described in U.S. Pat. No. 3,171,820 to Volz.

In Example 2, an open cell, ether base foam prepared according to U.S. Pat. No. 3,884,848 to Ricciardi, Cordora and Smudin was used. The foam had 45 pores per linear inch.

The foams of Examples 1 and 2 were flame laminated using apparatus similar to that of FIG. 1. In FIG. 1, the numeral 1 represents a foam feed roll, the numerals 2 represent tension rolls, the numerals 3 represent nip rolls, the numeral 4 represents a flame bar, the numeral 5 represents paper, and the numeral 6 represents a product wind-up roll.

In the flame lamination of the foam of Example 1, the flame bar 4 was set horizontal with the flame a visible blue (temperature about 1700°–2000° F.) and with the tip of the flame about 0.25 inch from the foam. The nip rolls 3 were set to give 50 per cent compression.

From roll 1, and from thence between rolls 3 and onto roll 6, there was fed a 20-inch wide and one-inch thick sheet of the foam of Example 1. Simultaneously, there was fed to the apparatus a 20-inch wide strip of cured automotive air filter paper 5 (James River W-1439 grade). The stiffness of the paper, because the resin therein was cured, required slow lamination, about 20 linear feet per minute, to produce a laminate which was well-mated. The laminate was relatively stiff, but it could be wound on roll 6.

When the foam of Example 2 was used in place of the foam of Example 1, good mating was obtained when the foam of Example 2 had a thickness of ¾-inch and when the speed at which the apparatus operated was 25 linear feet per minute. Also, when the foam of Example 2 at a thickness of ¾-inch was used with uncured paper, flexible, easily wound-up rolls of laminate were produced at a linear rate of 200 feet per minute and more. In addition, when the uncured filter paper was replaced with one ounce per square yard weight of spun-bonded nylon 6—6 of 3.5 filament denier, there was produced a very soft, pliable combination at a rate of at least 200 linear feet per minute.

EXAMPLE 3

In this Example, the foam used was prepared according to U.S. Pat. No. 3,748,288 to Winkler, Bredbenner and Adlum. The foam had a density of about 1.75 pounds per cubic foot, a tensile strength of 12.0 pounds per square inch, a tear strength of 3.0 pounds per inch, and a per cent elongation of 200. The foam had 40 pores per linear inch and was gray in color.

In the laboratory, the upper horizontal face of a flat piece of the foam (12-inch by 12-inch by one inch) was kiss-coated with polyvinyl chloride latex using a small paint roller just barely wet with the latex. A 12-inch by 12-inch sheet of cured automobile air filter paper was immediately gently placed on the foam, after which a 12-inch by 12-inch sheet of plate glass was placed on the paper. The total weight bearing on the paper, including the glass and weight placed thereon, was 12 pounds, and the weight was evenly distributed.

The arrangement was permitted to sit at room temperature over the weekend. After that period, the product showed weak and inconsistent bond strength at about 7 weight per cent dry polyvinyl chloride pickup, and less than 10 per cent loss of air permeability or height compared to the unlaminated combination of foam and paper. Increasing the polyvinyl chloride pickup to 31 per cent, again based upon the amount of polyvinyl chloride in the latex, gave slightly better interface-bonding, but a 22 per cent loss of air permeability. Because of this loss, the product was unusable.

EXAMPLE 4

In this Example, the open cell polyurethane foam used had 60 pores per linear inch, contained reacted tribromoneopentyl alcohol as a flame-retardant, and was orange in color.

Four different commercially available hot melt films were used as the adhesive in laminating automobile air filter paper to the foam. In each of the four experiments, a 12-inch by 12-inch sheet of the film was placed on top of a 12-inch by 12-inch by one inch sheet of the foam, and a 12-inch by 12-inch sheet of uncured filter paper was placed on top of the sheet of the film. Each sample was then covered with a sheet of aluminum foil and then a sheet of Teflon film (to prevent sticking). Each combination was then ironed for two minutes using a heavy steam iron. Each combination was then cured for 5 minutes in a 350° F. oven with 10 pounds of weight being uniformly distributed against the upper (paper) layer.

The hot melt films used were (1) an ethylene-acrylic copolymer which was not perforated and had a thickness of one mil; (2) a high density polyethylene perforated by an embossed design, having a thickness of 4.5 mils, 52 per cent open space and weighed one pound per 50 square yards; (3) open web (non-woven) polyamide weighing 19-21 grams per square yard; and (4) a nonwoven polyurethane web.

Of the four samples, only the one made using the ethylene-acrylic was unusable because of impermeability. The other three had at least 90 per cent of the permeability of the unlaminated combination of the paper and the foam.

EXAMPLE 5

The procedure of Example 4 was repeated, but in the case of this Example 5 the adhesive used was a linear adhesive which had a yield of 6,000 feet per pound and was made with a polyester core strand and a hot melt adhesive (ethylene-vinyl acetate) with a relatively low melting point (R. & B. softening point of 150° F.). per cent When a series of similar foam-uncured paper laminates was made, but using different numbers of the linear adhesive between the foam and the paper, good adhesion at the strings was obtained without loss of permeability when as few as two strings of adhesive were used between the 12-inch by 12-inch faces.

EXAMPLE 6

The foam used was an open cell, black, mostly ester base textile grade polyurethane foam prepared according to U.S. Pat. No. 3,748,288 to Winkler, Bredbenner and Adlum. The foam had a density of about 1.75 pounds per cubic foot, a tensile strength of 12.0 pounds per square inch, a tear strength of 3.0 pounds per inch, a per cent elongation of 200, and 45 pores per linear inch.

Four inch by 4-inch by ¾-inch squares of the foam which had been laminated to automobile air filter paper were coated on the foam side with a hand roller coater dipped in 100 per cent dimethyl silicone fluids having viscosities of 5, 50, 100, 500, 1000 and 5000 centistokes at 25° C., respectively, to provide pickups of 19-23 per cent by weight, based upon the dry weight of the laminate. The various samples were allowed to stand for one week at 90° C. in an oven with the foam side up. The samples made with the 5 and 50 centistoke fluids wet the paper and were unsatisfactory. In the sample made using the 5000 centistoke fluid, the silicone had not fully started to migrate downward, and was probably a useful impregnated filter. The samples made with the 100, 500 and 1000 centistoke fluids were useful impregnated filters.

EXAMPLE 7

In this Example, samples of the laminate using cured paper prepared as described in Example 2 were treated with an impingement fluid which was an emulsion containing 35 parts by weight of a silicone oil, 3 parts by weight of polyoxyethyl-ethanol derivatives of p-alkylphenols, and 62 parts by weight of water.

This emulsion was rolled on laminates (foam face only) made from the foam described in Example 6 laminated to cured paper as described in Example 2. The pickups amounted to 20, 30, 40, 50 and 75 per cent by weight of dry silicone oil, based upon the weight of the laminate. The samples were kept at 350° F. for 10 minutes and then at 194° F. for 3 days in an oven with the foam side up. The laminates with pickups of 50 per cent and 75 per cent were wet looking and feeling and were unsatisfactory. The laminates with lower pickups were useful impregnated filters.

EXAMPLE 8

The laminate used in this Example was made from an open cell polyurethane foam which had 80 pores per linear inch, contained reacted tribromoneopentyl alcohol as a flame-retardant, was one-half inch thick, and was black in color. The foam was laminated to automobile air filter paper.

Using a perfume atomizer, poly(dimethyl-siloxane) fluid of 10, 500, 1000 and 5000 centistokes viscosity at 25° C. was sprayed onto the foam surface, the pickup being 30-35 per cent by weight. The 10 centistoke fluid penetrated too far, the 5000 centistoke fluid was difficult to handle, and the remaining fluids gave useful impregnated filters. The Example shows the feasibility of spraying 100 per cent silicone fluid.

EXAMPLE 9

The foam used was made according to Example 8 of U.S. Pat. No. 3,884,848 to Ricciardi, Cordora and Smudin. The foam had 40-42 pores per linear inch, had a density of 1.7 pounds per cubic foot, and was black in color. The foam, in the form of a one-half inch peeling, 20 inches wide, was flame-laminated to uncured automobile air filter paper (James Rivers W 1439 grade) as described in Example 2.

The laminate was impregnated with the emulsion of Example 7 and simultaneously dried and heated to cure the paper on a single pass through a commercial print coating line at about 30 feet per minute. The foam side only of the laminate was roll-coated to about a 35 per cent by weight dry pickup, and the laminate was then continuously passed through about 90 feet of oven set at 350° F. The resultant laminate was dry-appearing on both sides, and the paper was appreciably stiffer than when received, that is, the paper was cured. The laminate was a useful impregnated filter.

When cured paper was used, the final product was too dark and brittle on the paper side to be useful.

EXAMPLES 10, 11 and 12

Figure 2:
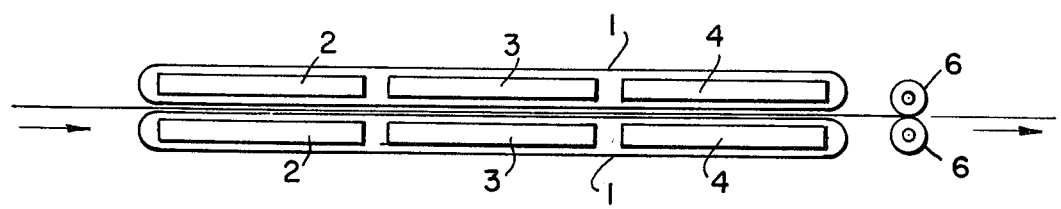
FIG. 2 represents in diagrammatic form an apparatus in which the composite filter medium of this invention can be manufactured by a procedure in which heated platens are used to bond the polyurethane foam to the non-woven fibrous material by means of a hot melt adhesive.

These Examples are to be considered in relation to FIG. 2, which represents in diagrammatic form a commercial laminator, the oven of which has a length of about 100 feet. In FIG. 2, the numerals 1 represent moving belts, the numerals 2, 3 and 4 represent the variable platens of three sets of heated presses, and the numeral 6 represent unheated steel nip rolls.

In Example 10, as a bottom layer a ¾-inch thick by 20-inch wide strip of open cell polyurethane foam, which was red in color, had 60 pores per linear inch, and contained reacted tribromoneopentyl alcohol as a flame retardant, was fed as a bottom layer. Immediately above the foam was fed a 20-inch wide layer of open web (non-woven) polyamide hot melt adhesive weighing 19-21 grams per square yard, above which was fed a 20-inch wide strip of uncured commercial automotive air filter paper. The three layers were compressed to about 90 per cent of their uncompressed thickness. At a speed of about 50 feet per minute, with the first two sections at 400° F. and the third at 415° F., a satisfactory lamination was obtained.

In Example 11, with a one-inch thick foam on top of the hot melt adhesive on top of the paper, satisfactory lamination was obtained by passing the layers through only the last two sections of the presses with platen temperatures of 400° F. and 415° F. at about 50 feet per minute linear speed. The paper appeared less burnt and brittle than in Example 10.

In Example 12, the procedure of Example 11 was repeated, but with the platen gaps set to compress the foam to 70 per cent of its uncompressed height. The bond was slightly better than in Example 11, but there was noticeable and undesirable loss of height and permeability.

The products of Examples 10 and 11 were satisfactorily post-impregnated with both silicone spray to 25 and 35 weight per cent pickup, as in Example 8, and by roll-coating a silicone emulsion, as in Example 7.

EXAMPLE 13

This Example is to be considered in connection with FIG. 3 which in diagrammatic form represents a commercial laminating line. In FIG. 3, the numerals 1, 2, and 3 represent feed rolls from which are fed polyurethane foam, hot melt adhesive and uncured automotive air filter paper, respectively, each of the materials fed having a width of 60 inches. The numerals 4 represent a 3-roll heated, variable pressure laminator made of steel rolls, the numerals 5 represent guide and idler rolls, the numeral 6 represents a shallow trough containing liquid impregnant, and the numeral 7 represents a gas-fired oven.

The polyurethane foam fed was that of Example 10 but having a thickness of one-inch and the hot melt adhesive fed was the open web (non-woven) polyamide of Example 4. The rolls 4 were heated to 415° F. The trough 6 contained the emulsion of Example 7 in depth sufficient to penetrate only the bottom quarter inch of the one-inch foam, the foam being face-down in the trough, so that the paper was not wetted. The oven 7 was 30-feet long and was maintained at about 350° F.

The apparatus was operated in such manner that the silicone pickup on a dry basis varied between 20-25 weight per cent and 30-35 weight per cent. This was done by adjusting the emulsion level in the trough and/or the line speed and/or dilution of the emulsion. The operation gave a dry-looking laminate in which the paper was cured, but not overheated.

FIG. 4 represents in diagrammatic form an apparatus in which a laminate similar to that produced using the apparatus of FIG. 3 can be made. In the apparatus of FIG. 4, the impregnant is silicone oil as such, rather than a siliconecontaining emulsion, and no oven is used. In the apparatus of FIG. 4 the numerals 1,2 and 3 represent foam, hot melt adhesive and uncured paper feed rolls, respectively. The numerals 4 represent a three-roll heated variable pressure laminator in which the rolls are made of steel, and the numerals 5 represent guide and idler rolls. Still referring to FIG. 4, the numerals 6 designate auxiliary laminator rolls, the numeral 7 designates a cooling roll, the numeral 8 designates a spray of silicone fluid, the numeral 9 designates a wind up roll. An interleafer (not shown) is used to keep the silicone fluid from smearing the paper by feeding polyethylene film interleaf.

EXAMPLE 14

Using the general procedure of Example 9, impregnated laminates having 8, 13 and 35 weight per cent pickup of dry silicone were prepared.

The laminate having 35 weight per cent pickup showed 99.7 per cent filtration efficiency per Air Cleaner Test Code — SAE J726a, section 8.2 using coarse dust, the maximum air flow used being the rated air flow and the test being terminated after an increase in restriction of 10 inches of water. The laminate showed 125-150 grams of filter capacity per Air Cleaner Test Code — SAE J726a, section 9.2, the maximum air flow being the rated air flow using coarse dust and the test being terminated after an increase in restriction of 10 inches of water.

The laminates having 8 per cent and 13 per cent pickup had one-half or less of the desired filter capacity of 150 grams using the test mentioned in the preceding paragraph, but showed excellent filtration efficiencies (99 per cent) using the test mentioned in the preceding paragraph.

EXAMPLE 15

A sample of the laminate produced as described in Example 11 was sprayed with silicone oil having a viscosity of 500 centistokes at 25° C. in amount sufficient to provide 32 weight per cent pickup. The impregnated laminate showed a filter capacity of 215 grams and a filtration efficiency of 99.9 per cent when tested using the test methods mentioned in Example 14.

When the experimental work was repeated, but using a foam of ¾-inch thickness, the filter capacity was 240 grams and the filtration efficiency was 99.82 per cent.

EXAMPLE 16

A sample of the impregnated laminate made as described in Example 15 with foam having a thickness of one-inch was held for 10 minutes at 300° F., was then exposed to a flow of 45 cubic feet per minute of air containing gasoline vapor (a total of 2102.5 grams of gasoline), was air-dried for 24 hours, and was then tested. The sample showed a filter capacity of 223 grams and a filtration efficiency of 99.94 per cent when tested using the test methods mentioned in Example 14.

EXAMPLE 17

A sample of the impregnated laminate made as described in Example 15 with foam having a thickness of ¾-inch was suspended for 24 hours at 275° F. with the foam side down to test for the migration of impingement fluid. At the end of that time, the sample had lost only about 8 per cent of its original filter capacity (excellent) and had a filtration efficiency of 99.89 per cent.

What is claimed is:

1. A fluid-permeable article of manufacture suitable for use in the removal of solid particles from a fluid by filtration, said article consisting of a layer of open cell polyurethane foam adhered by adhesive means to a layer of non-woven fibrous material of fine porosity relative to the porosity of the foam, said foam being impregnated with an impingement fluid, and said adhesive means being a permeable layer of a thermoplastic hot-melt adhesive.

2. An article of manufacture according to claim 1 wherein the pore size of the foam is within the range from about 8 to 125 pores per linear inch.

3. An article of manufacture according to claim 1 wherein the fibrous material is air filter paper.

4. An article of manufacture according to claim 1 wherein the impingement fluid is a dimethyl silicone oil.

5. An article of manufacture according to claim 4 wherein the dimethyl silicone oil has a viscosity of from about 100 centistokes to about 1000 centistokes, at 25° C.

6. An article of manufacture according to claim 1 wherein the hot-melt adhesive is an open web polyamide.

7. An article of manufacture according to claim 1 wherein the hot-melt adhesive is a perforated film of high density polyethylene.

8. An article of manufacture according to claim 1 wherein the hot-melt adhesive is a non-woven polyurethane web.

9. An article of manufacture according to claim 1 wherein the hot-melt adhesive is a string adhesive consisting of an ethylene-vinyl acetate hot-melt adhesive on a polyester core strand.

10. A method for the manufacture of an article suitable for use in the removal of solid particles from a fluid by filtration which comprises subjecting a sandwich consisting of an outer layer of open cell polyurethane foam, an outer layer of non-woven fibrous material of fine porosity relative to the porosity of the foam and an intermediate permeable layer of thermoplastic hot-melt adhesive to the action of heat and pressure whereby the adhesive is melted, following which the sandwich is cooled to solidify the adhesive, whereby the adhesive adheres the foam to the fibrous material, and following which the foam layer is impregnated with an impingement fluid.

11. A method according to claim 10 wherein the fibrous material is air filter paper containing an uncured resin which is cured by the action of the heat and pressure used to melt the adhesive.

12. A method according to claim 11 wherein the uncured resin is a resin selected from the group consisting of phenol-formaldehyde, urea-formaldehyde and melamine-formaldehyde resins.

* * * * *